March 30, 1943.  D. J. AJOUELO ET AL  2,315,382
MACHINE FOR UNITING LAYERS OF MATERIALS
Filed May 26, 1938  10 Sheets-Sheet 2

Inventors
DAVIS J. AJOUELO and JAMES LINTON MOORE, deceased.
By SUSAN ANSLEY MOORE, EXECUTRIX By Semmes, Keegin & Semmes
Attorneys

March 30, 1943. D. J. AJOUELO ET AL 2,315,382
MACHINE FOR UNITING LAYERS OF MATERIALS
Filed May 26, 1938 10 Sheets-Sheet 4

DAVIS J. AJOUELO, Inventors
JAMES LINTON MOORE, deceased
By SUSAN ANSLEY MOORE,
EXECUTRIX By Semmes, Keegin & Semmes
Attorney

March 30, 1943.  D. J. AJOUELO ET AL  2,315,382
MACHINE FOR UNITING LAYERS OF MATERIALS
Filed May 26, 1938   10 Sheets-Sheet 5

DAVIS J. AJOUELO, Inventors
JAMES LINTON MOORE,
  deceased.
By SUSAN ANSLEY MOORE,
  EXECUTRIX.
By Semmes, Keegin & Semmes
  Attorneys Patented Mar. 30, 1943

2,315,382

UNITED STATES PATENT OFFICE 2,315,382

MACHINE FOR UNITING LAYERS OF MATERIAL

Davis J. Ajouelo, Atlanta, Ga., and James Linton Moore, deceased, late of Atlanta, Ga., by Susan Ansley Moore, executrix, Decatur, Ga., assignors to The Auto-Soler Company, Atlanta, Ga., a corporation of Georgia Application May 26, 1938, Serial No. 210,266

8 Claims. (Cl. 1—19)

The present invention relates to an apparatus for uniting layers of material and more particularly to an apparatus for uniting layers of material such as the soles of shoes or the like. While we will show our inventive concept employed in connection with machinery for soling, it is of course to be understood that it is of much broader application and can be used, for instance, in securing boxes, crates and the like. This invention is generally similar to the machine shown in Patent No. 2,049,240 but constitutes an improvement thereover.

One important object of the present invention is to provide a machine for making and inserting fastening elements into layers of material including a cutting arrangement which will form and position each fastening element for insertion into the material to be united.

Another object of this invention is to provide a machine for making and inserting fasteners which includes means for feeding the wire to the cutting mechanism, maintaining the wire against retraction, and controlling the feeding mechanism to determine and vary the lengths of the fastener elements.

A still further object of this invention is to provide a machine for making and inserting metallic fasteners which includes a wire feeding mechanism, a cutting mechanism and a fastener inserting mechanism which are synchronously associated, and means for operating said mechanisms.

Yet another object of this invention is to provide a machine for making and inserting metallic fasteners having a wire feeding mechanism and an inserting mechanism synchronously associated therewith and means to prevent the inserting mechanism from moving upwardly until it has completed its fastener inserting movement.

A still further object of this invention is to provide a machine for making and inserting fasteners in layers of material to be united which includes means for regulating the position of the material to be united with respect to the fastener inserting mechanism.

Still another object of this invention is to provide a machine for making and inserting metallic fasteners to be used in connection with layers of material to be united which includes an anvil mechanism adapted to be engaged with the material during the uniting operation.

Yet a further object of this invention is to provide a machine for making and inserting metallic fasteners from a continuous wire in which the wire feeding mechanism, cutting mechanism and wire inserting mechanism are disposed in a casing which is removably affixed to the machine.

Yet still another object of the present invention is to provide a machine for making and inserting metallic fasteners in which the fastener is formed, inserted, and clinched in the material to be united by a single movement on the part of the operator.

Yet a still further object of the present invention is to provide a machine for making and inserting fasteners into layers of material to be united which is composed of relatively few essential working parts and which can be easily and cheaply manufactured.

Another object of our invention is to provide a machine for making and inserting metallic fasteners into layers of material to be united which includes means whereby the machine can be employed for soling a stitch down type of shoe.

A further object of this invention is to provide a guide for regulating the position of the materials to be united with respect to the fastener inserting mechanism which can be moved easily out of the path of the inserting mechanism.

With the above and other important objects in view which may be incident to our improvements, the invention consists in the parts and combinations to be hereinafter set forth and claimed, with the understanding that the several necessary elements comprising our invention may be varied in construction, proportions and arrangement without departing from the spirit and scope of the appended claims.

In order to make our invention more easily understood, there is shown in the accompanying drawings means for carrying the same into practical effect without limiting the improvements in their useful applications to the particular constructions which, for the purpose of explanation, have been made the subject of illustration.

In the drawings in which like numerals designate similar parts.

Broadly, this invention discloses an apparatus for making and inserting metallic fasteners formed from a continuous wire into layers of materials to be united. The machine embodies a wire feeding mechanism, a plunger or fastener inserting mechanism and a knife or wire cutting mechanism. The above mentioned mechanisms are synchronously associated, and a single operation on the part of the operator serves to cause each of the mechanisms to perform its respective functions. The machine also includes guide means whereby it can be adjusted for different operations, such as, securing soles, attaching heel lifts, etc. In addition, there is further provided an attachment which will enable the machine to be used for resoling a so-called stitchdown type of shoe.

Figures 1, 2:
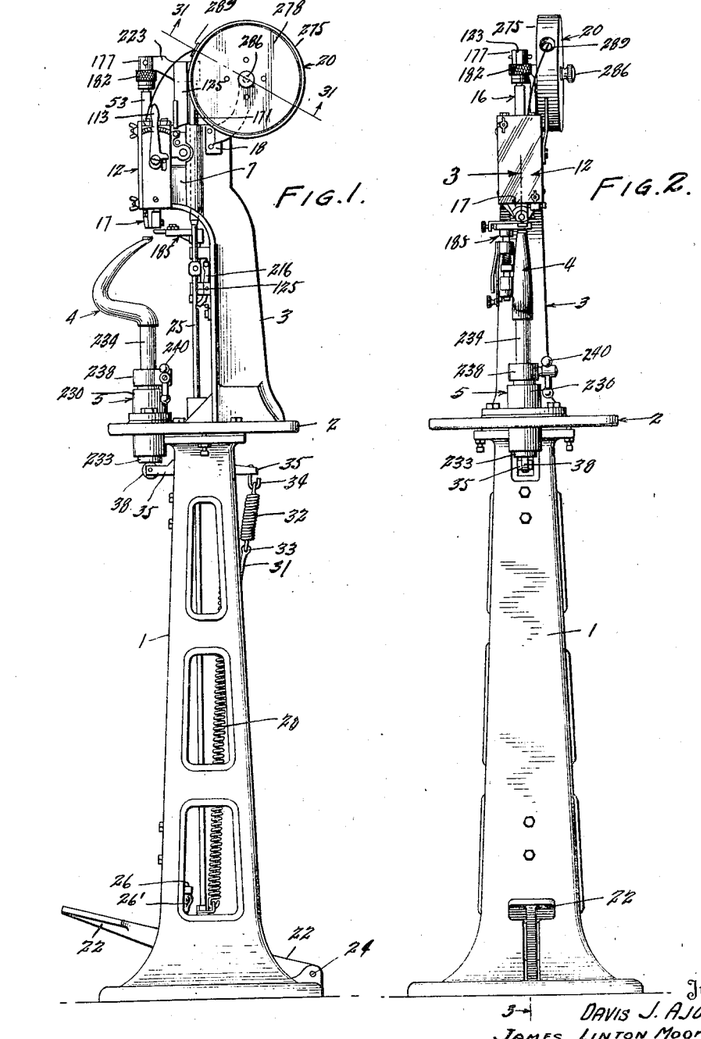
Figure 1 is a view in side elevation showing our machine for making and inserting fasteners.
Figure 2 is a view in front elevation of the machine shown in Figure 1.

Referring to Figure 1, there is shown a machine for making and inserting metallic fasteners into layers of material comprising a base or standard 1, a shelf 2 suitably attached to the top of the standard and a bracket 3 carried by the shelf. A vertically movable anvil or horn 4 is supported in a sleeve 5 which extends through an aperture in the shelf 2. As will later be discussed more fully, the horn 4 is adjustable to accommodate different shapes and sizes of shoes to be worked upon.

Figures 10, 11:
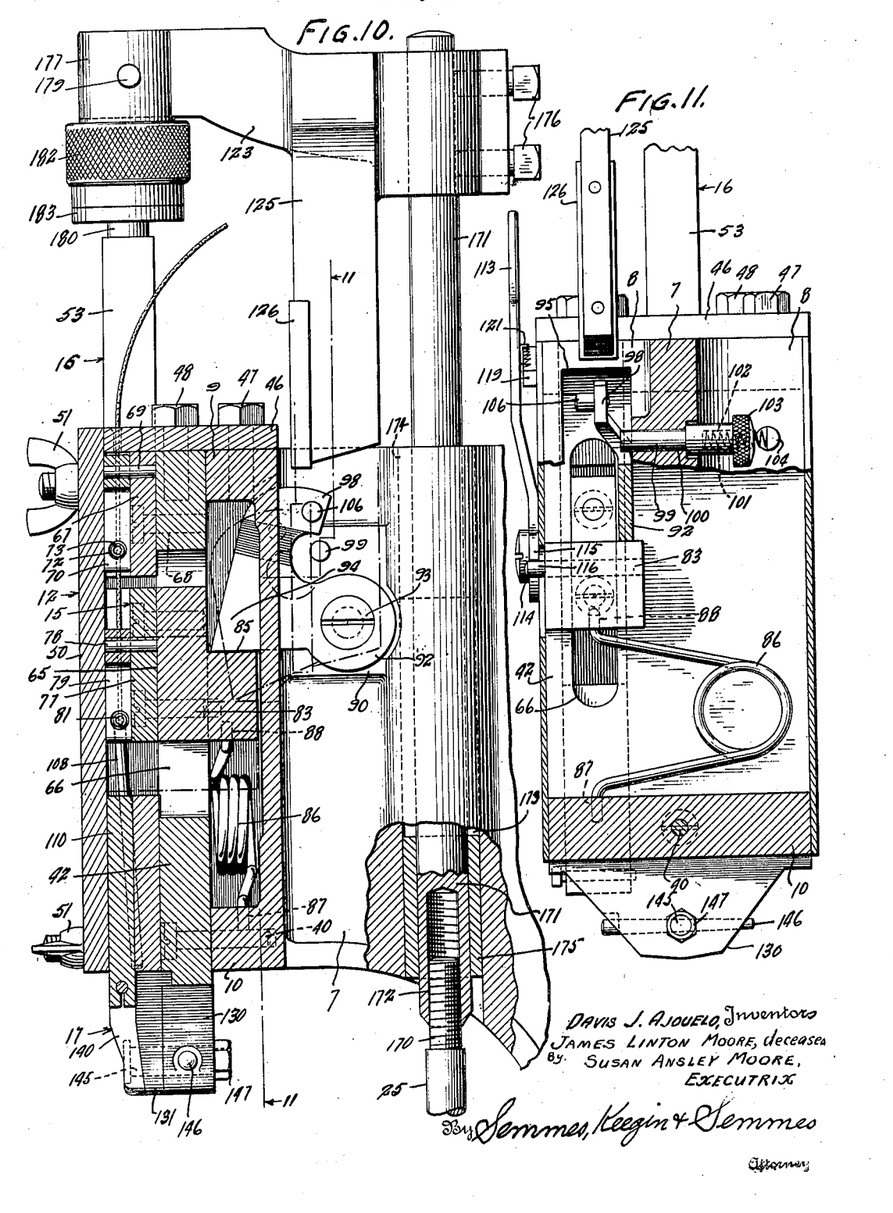
Figure 10 is a view taken along line 10—10 of Figure 8 looking in the direction of the arrows.
Figure 11 is a view taken along line 11—11 of Figure 10.
Figure 12:
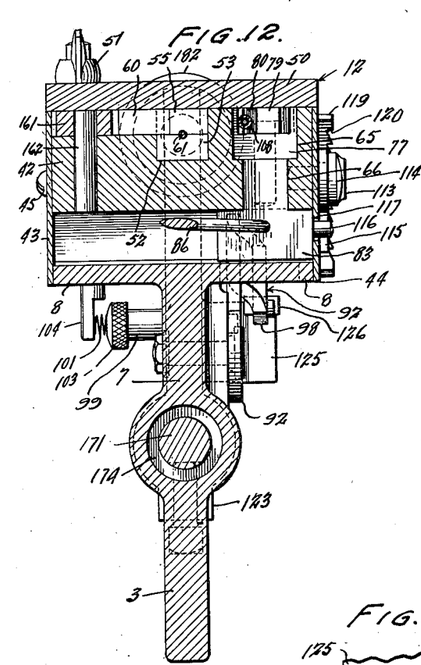
Figure 12 is a view taken along line 12—12 of Figure 8 looking in the direction of the arrows.

The bracket 3 terminates in a head 7 provided with lateral flanges 8 and horizontally extending portions 9 and 10 at the upper and lower ends of the head (Figures 10 and 12). A housing or casing designated generally 12 is removably secured to the head 7 and contains a wire feeding mechanism 15, a plunger mechanism 16, and a knife or fastener forming mechanism 17.

Carried on a bracket 18 secured to the head 7 is a casing 20 in which is rotatably mounted a reel of wire adapted to be guided into the housing 12 as depicted at 21.

The feeding, plunger and cutting mechanisms 15, 16 and 17 respectively, together with the horn 4 are operated by means of a treadle or foot pedal 22 which is pivoted to the base 1 as shown at 24. An operating rod 25 is pivoted to the pedal 22 at 27 and a spring 28 is attached at one end to the connection 27 and at the opposite end to the base 1 as shown at 29. The spring 28 tends to urge normally the rod 25 upwardly as can be clearly seen in Figure 3.

Also pivoted to the pedal 22 as shown at 30 is a rod 31. A spring 32 has one end thereof secured to the upper end of the rod as at 33 and the other end looped over a hook 34 carried by an operating arm 35. The arm 35 is pivoted as shown at 36 in a bracket 37 secured to the inner wall of the base 1. A roller 38 is mounted in a bifurcated end of the arm as shown at 39 and is disposed immediately beneath the horn 4 as clearly shown in Figure 3.

As will later become obvious, when pressure is applied to the treadle 22, the feeder, plunger and cutting mechanisms together with the horn will be operated simultaneously. To limit upward movement of the pedal 22 and the control rod 25 there is provided a stop 26 which is secured to the inner wall of the base 1. By reference to Figure 3 it can be seen that a buffer 26' is pivotally secured to the pedal 22 and is preferably formed of rubber or some similar shock absorbing material. Clearly, the buffer 26' is adapted to strike the stop 26. This structure serves not only as a limit for the upward stroke of the rod 25 but also reduces the shock and vibration incident to the release of the pedal 22.

Figure 13:
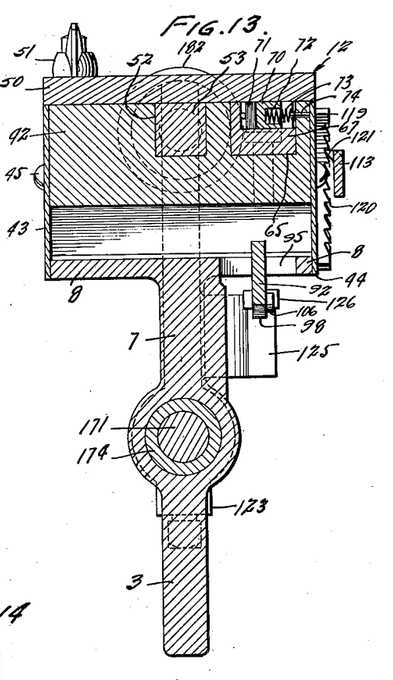
Figure 13 is a view taken along line 13—13 of Figure 8 looking in the direction of the arrows.

Secured to the horizontal portion 10 of the head 7 by a screw 40 is the lower end of a head casting depicted at 42, which serves as a support and guide for the wire feeding, plunger and cutting mechanisms 15, 16 and 17. In Figures 12 and 13 it can be noted that side plates 43 and 44' are secured to the casting by screws 45 and a top plate 46 is affixed to the horizontal portion 9 as shown at 47 and to the casting 42 by a screw 48 securing the upper end of the casting 42 against the horizontal portion 9. A face plate 50 is removably positioned on the casting 42 by wing nuts 51.

Figure 15:
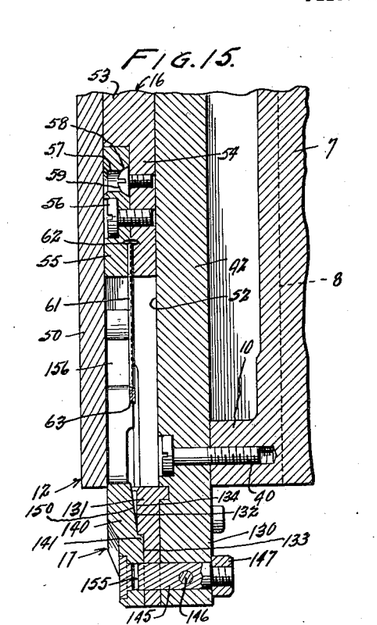
Figure 15 is a view taken along line 15—15 of Figure 8 looking in the direction of the arrows.

The casting 42 is recessed or grooved throughout its length as shown at 52 so as to provide a guideway for a plunger 53 which is slidably mounted therein. The plunger 53 is a portion of the plunger mechanism 16. In Figure 15, it can be observed that the extremity of the plunger 53 is reduced as shown at 54 to receive a block 55 which is secured thereto by a screw 56. Positioned immediately above the screw 56 in an aperture 57 having a flaring portion 58, is the head of a lifting screw 59.

Referring again to Figure 8, it can be seen that the block 55 is provided at one edge thereof with a cam surface 60. A driver or plunger point 61 having a head 62 and a concave end 63 fits in complemental apertures formed in the block 55 and the reduced portion 54. In the event it becomes necessary to remove the plunger point 61, the screw 56 is loosened and lifting screw 59 is then rotated in counter-clockwise direction, thus moving the block 55 outwardly freeing the plunger head 62. It is believed apparent that this construction is highly desirable as it will permit the easy removal of the plunger point for the purpose of repair, replacement or cleaning.

The casting 42 is also cut away or grooved adjacent the area 52 as shown at 65 and is further provided with an elongated aperture 66. Positioned in the portion of the groove 65 is a block 67 which is secured to the casting by a screw 68. Pivoted to the block at 69 is a holdback key 70 having a wire engaging projection 71. In Figure 13, it can be seen that the lower portion of the key 70 is recessed at 72 to form a seat for one end of a coil spring 73, the other end of the spring fitting around a pin 73 affixed in the side wall of the groove 65. The spring 73 tends to hold the projection 71 in engagement with a strand of wire to prevent retraction of the wire unless it moves out of engagement therewith in the manner to be later set forth.

The wire feeding mechanism includes a block 77 slidably mounted in the groove 65 below the block 67. Pivoted to the block 77 at 78 is a feeder blade 79 having an offset portion 80 which is adapted to engage the wire. A spring 81 similar in construction and operation to the spring 73 holds the projection 80 normally in engagement with the wire as shown in Figure 9.

As seen in Figure 10, there is secured to the rear face of the block 77 an extension 83 which is adapted to move the feeder block 77 and it extends rearwardly through the aperture 66 formed in the casting 42. The extension 83 is cut away to form a ledge 85. A spring 86 having one end thereof secured in the horizontal member 10 as shown at 87 and the other end fixed to the extension 83 as shown at 88 is adapted to maintain normally the feeding mechanism in elevated position.

The extension 83 together with the feeder block 77 is adapted to be moved downwardly by means of a feeder cam 92. The feeder cam 92 is pivotally mounted on a boss 90 on the member 7 by means of a screw 93. The cam 92 is provided with an extension 94 which projects through an aperture 95 in the rear portion of the member 7 and engages the ledge 85. As shown in Figures 10 and 11, the cam 92 is formed with an offset area 98 and a latch 99 which slides through an aperture 100 in the member 7 will prevent the cam 92 from moving too far in a rearwardly direction. A tension spring 101 fits within a recess 102 in an enlarged portion of the latch to keep the same in the position shown in Figure 11. However, by pulling on a head 103, the latch 99 may be withdrawn into the member 7 against the action of spring 101 and permit the cam 92 to be moved completely back about its pivot 93 and out of engagement with the extension 83. Clearly, as will become apparent, by thus moving the cam, the wire feeding mechanism may be thrown out of operation. In order to facilitate manual operation of the cam, a finger engaging pin 106 is provided on the offset portion 98. It should be noted that a stop 104 is secured to the flange in the line of movement of the latch 99 so as to act as a seat for the spring 101 and to prevent the complete withdrawal of the latch from the aperture.

Figure 9:
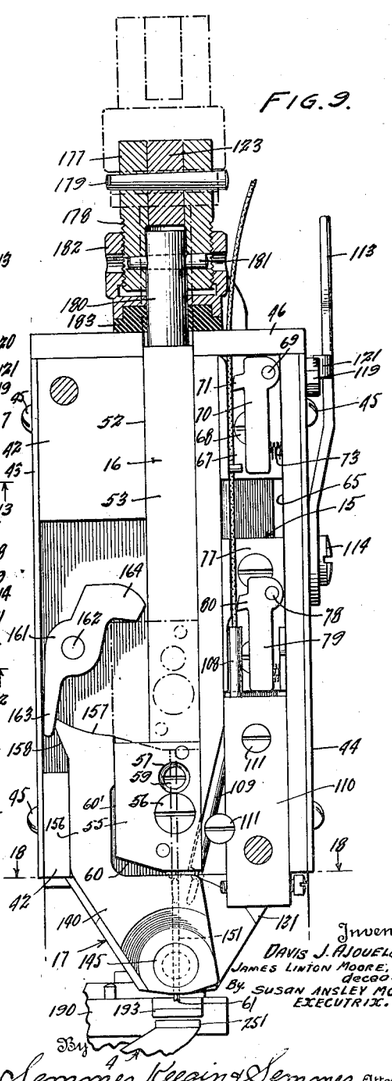
Figure 9 is a view similar to Figure 8, showing the parts in the fastener inserting position.

As best shown in Figure 9 a guide tube 108, the lower portion of which extends in a diagonal direction as depicted at 109 is mounted at the lower end of the groove 65. A plate 110 having a grooved portion in which the tube 108 fits is positioned thereover and is secured to the casting by screws 111. The tube 108 serves to guide the wire to the cutting mechanism 17 after it has been advanced the proper distance by the feeder 15.

As previously pointed out, this invention provides means whereby the length of the fastener can be varied at the will of the operator. This is accomplished by adjustably limiting the upward movement of the feeder blade 79. By reference to Figure 14, it can be noted that a lever arm 113 is pivoted at 114 to the side wall 44 of the housing. Immediately adjacent the pivot point 114, the arm 113 is formed with an extension 115 which engages a pin 116. The pin 116 extends through an elongated slot 117 in the side plate 44 and is suitably secured to the extension 83 in any manner desired.

Figure 14:
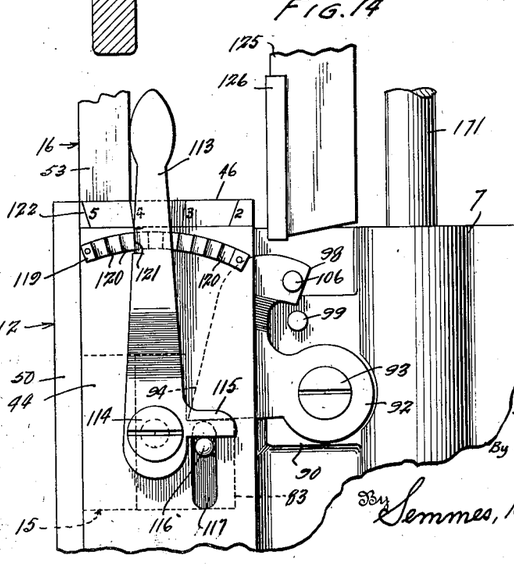
Figure 14 is a fragmentary view in side elevation showing the fastener regulating arm.

A segment 119 having teeth 120 is mounted on the side plate 44 adjacent its upper end and detent 121 carried by the lever 113 is adapted to engage the teeth of the segment. Movement of the lever arm 113 and the projection 115 which engages the pin 116 will determine the upward movement of the feeder 15 to control the length of the stroke of the feeding mechanism and fix the length of the fastening element. A graduated scale 122 may be provided so as to aid the operator in determining the required length of the fastener required.

At this time it might be well to point out briefly the manner in which the wire feeding mechanism 15 is actuated. When the foot pedal 22 is depressed, the control rod 25 is moved downwardly which in turn pulls down a crosshead 123 attached to the upper end thereof. A feeder arm 125 having a hardened wearing surface 126 which is carried by the crosshead is likewise moved downwardly and engages the offset portion 98 of the cam 92. The extension 94 of the cam which bears against the ledge 85 of the extension 83 will move the same downwardly the required distance and simultaneously with this movement of the extension the offset portion 89 of the feeder blade 79 will bite into the wire and move it downwardly a distance which is equal to the downward stroke of the feeding mechanism. When the feeder arm 125 has thus moved the wire feeding mechanism, during the initial movement of the operating rod 25, the plate 126 will slide over the offset extension 98 of the cam 92, permitting no further movement of the feeder mechanism. In this manner, the operating rod 25 may continue in its downward stroke to perform subsequent operations as will be later described. Immediately upon completion of the downward stroke of the operating mechanism and by release of foot pressure on the pedal 22 the same will be moved upwardly and when the plate 126 has again passed the offset 98, the spring 86 will urge the feeding block 83 back to its normal position where the pin 116 bears against the extension 115 of the lever 113. The feeding mechanism is then in position for another operation.

The lower extremity of the casting 42 is provided with a substantially V-shaped extension 130 on which is mounted a stationary knife member 131. The stationary knife member 131 is virtually a triangular shaped plate conforming to the V-shaped extension 130. The outer face of the stationary knife is provided with an arcuate beveled surface 132 and an annular recess 133 in the apex of the triangle and concentric with the beveled surface 132. An angular groove 134 is formed in the face of the knife extending radially from the upper edge 135 adjacent the end of the feed tube 108 into the beveled portion 132. A vertical groove 136 is similarly formed in the face of the knife. The upper ends of the grooves 134 and 136 are flared somewhat as indicated at 137.

A complemental, movable knife member 140 is provided with an annular boss 141 which is adapted to fit within the recess 133 to maintain the two knife members in co-acting relationship. A pin 145 (as clearly shown in Figures 15 and 16) holds the knife assembly together. This pin 145 passes through apertures provided therefor in both knife members and is securely held against rotation in the V-shaped extension 130 by means of a tapered pin 146 and a nut 147 affixed to a threaded end thereof.

Figure 16:
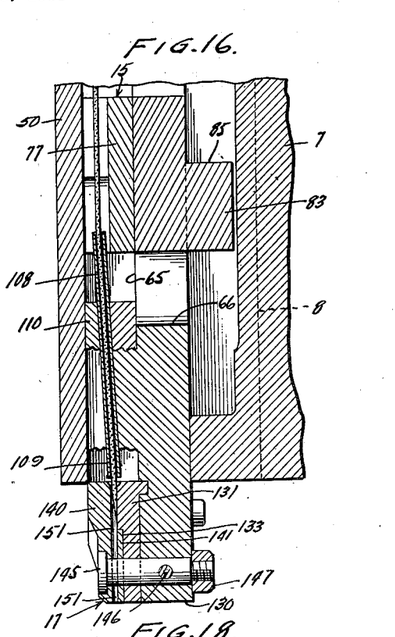
Figure 16 is a view taken along line 16—16 of Figure 8 looking in the direction of the arrows.
Figure 17:
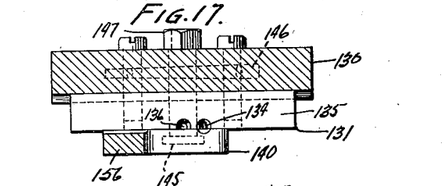
Figure 17 is a view taken along line 17—17 of Figure 8 looking in the direction of the arrows.
Figure 18:
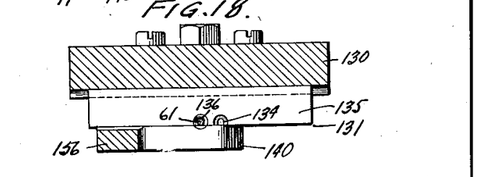
Figure 18 is a view taken along 18—18 of Figure 9 looking in the direction of the arrows.
Figure 19:
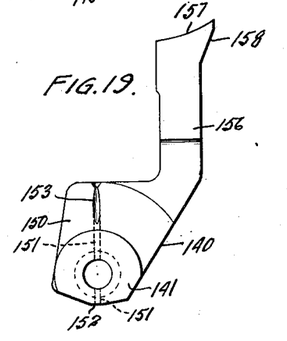
Figure 19 is a detailed elevational view showing the movable cutting member.
Figure 20:
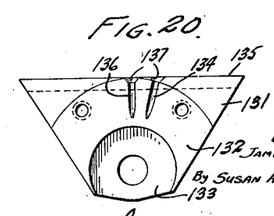
Figure 20 is a detailed elevational view showing the stationary cutting member.

The movable blade 140 is also provided with an annular beveled surface 150 which conforms with and bears against the beveled surface 132 of the stationary blade 131. An aperture 151 is formed in the blade 150 and extends from the lower edge 152 upwardly into the beveled surface 150 as shown in Figures 16 and 19. The edge 153 of this aperture 151 where it meets the beveled surface 150 is adapted to register with and form with the edge of the groove 134, an angular shearing surface for the wire to be cut. Pivotal movement of the movable blade 140, as will later be brought out, will also cause the portion 153 of the aperture 151 to register with the groove 136 to form therewith a continuous aperture through the knife. A vertical aperture 155 is provided in the pin 145 and is adapted to align with the aperture 151 when it is in its second described position to form an open passage for the cut wire and the plunger 61.

The two positions of the knife mentioned above may be called the wire cutting position and the fastener positioning position. To cause the movable blade to assume either of these positions, it is provided with an upwardly extending arm 156 which terminates in an arcuate surface 157 and an angular edge 158.

Figures 33, 34, 35, 36:
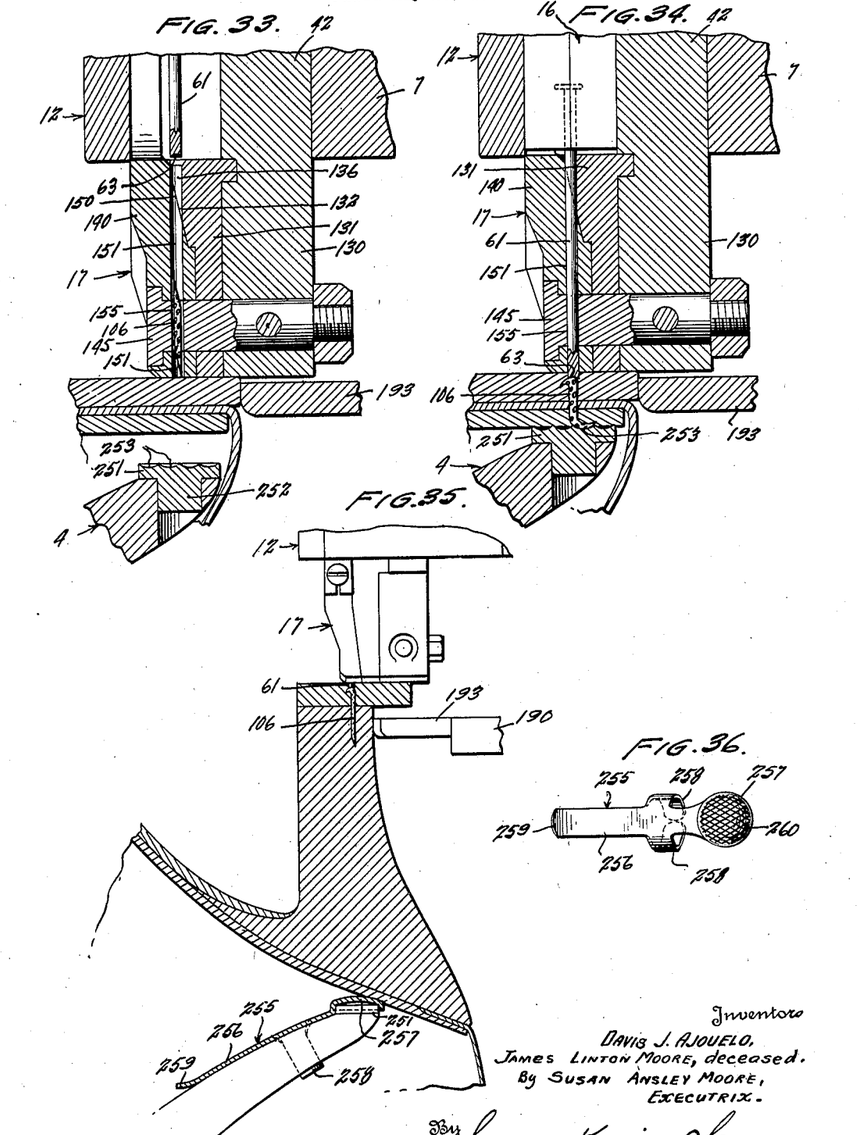
Figure 33 is a framentary sectional view of the cutting mechanism showing the material to be united in position, with the fastener element in position, prior to its insertion in the material.
Figure 34 is a view similar to Figure 33 showing the fastener inserted into the material and being clinched.
Figure 35 is a fragmentary view in section showing the manner in which the fastener is clinched when used in connection with a heel lift for a lady's shoe.
Figure 36 is a top plan view of the heel cap.

A predetermined length of wire is fed, as has been shown, through the feed tube 108 and into the groove 134 and the upper portion of the aperture 151 of the blade 140. Movement of the blade 140 will carry this length of wire with it to its second position shearing this length off from the remainder of the wire with an angular cut due to the beveled surfaces 132 and 150. This angular cut is clearly shown in Figure 16 and in the enlarged view of a fastener in Figure 45. By thus forming angular cuts on the ends of the fastener, it both facilitates driving the fastener through the materials to be joined and makes it possible to more easily form the clinched ends thereon as shown in Figure 34.

After shearing, the length of wire or formed fastener is carried in the aperture 151 to its vertical position over the aperture 155 in the pin 145 falling there through to the bottom of the aperture 151 where it is in position to be driven into the materials to be joined and clinched.

Figure 8:
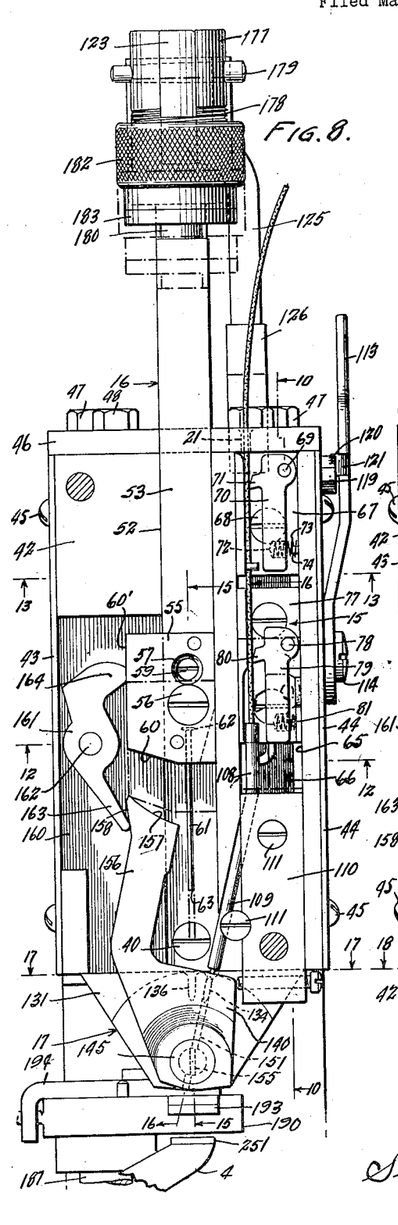
Figure 8 is a front view partly broken away, showing the housing containing the feeding, cutting, and inserting mechanisms with the cover plate removed and showing the parts in their initial or inoperative position.

In Figure 8, it can be seen that the casting 42 is recessed as shown at 160 to accommodate the arm 156 of the movable knife 140. A knife trip lever 161 is pivotally mounted in the recess as shown at 162. A depending portion 163 of the lever 161 is adapted to engage the face 158 of the knife arm 156 and maintain the knife in the wire receiving position by means of a lateral extension 164 of the lever engaging the vertical edge 60' of the cam block 55 as shown by the full lines in Figure 8. Upon downward movement of the plunger, the cam block 55 will disengage the extension 164 and the face 60 will engage the end 157 of the arm and move the same to a substantially perpendicular position aligning aperture opening 153 with the slot 136. Upon upward movement of the block 55, the upper end of the block 55 will engage the portion 164 of the lever 161 and cause it to return the arm 156 and movable blade 140 to their normal position.

Referring to Figure 10, it can be seen that the operating rod 25 is threaded at its upper end as shown at 170 and is screwed into a vertical extension 171 as at 172. The shaft 171 extends through a bore 173 formed in the member 7 which is provided with bushings 174 and 175. The upper end of the vertical shaft 171 is adjustably mounted in the crosshead 123 by means of set screws 176. Carried at the opposite end of the crosshead is a bifurcated member 177 which is exteriorly threaded at 178. The member 171 is attached to the crosshead by a pin 179. As shown in Figure 9, a reduced extension 180 of the plunger 16 is attached to the bifurcated member 177. The extension is secured in proper position within the bifurcated member by a pin 181. A knurled adjusting nut 182 carrying a rubber buffer 183 at its lower end is threaded on to the area 178 of the bifurcated member 177. The downward movement of the plunger 16 and the countersinking of the plunger point 61 into the materials to be united can be regulated by adjustment of the nut 182. In other words, by running the nut up to its uppermost position will make the countersink deeper and by running the nut in the opposite direction will make the countersink shallower.

Figures 21, 22, 23, 24, 25, 26, 27:
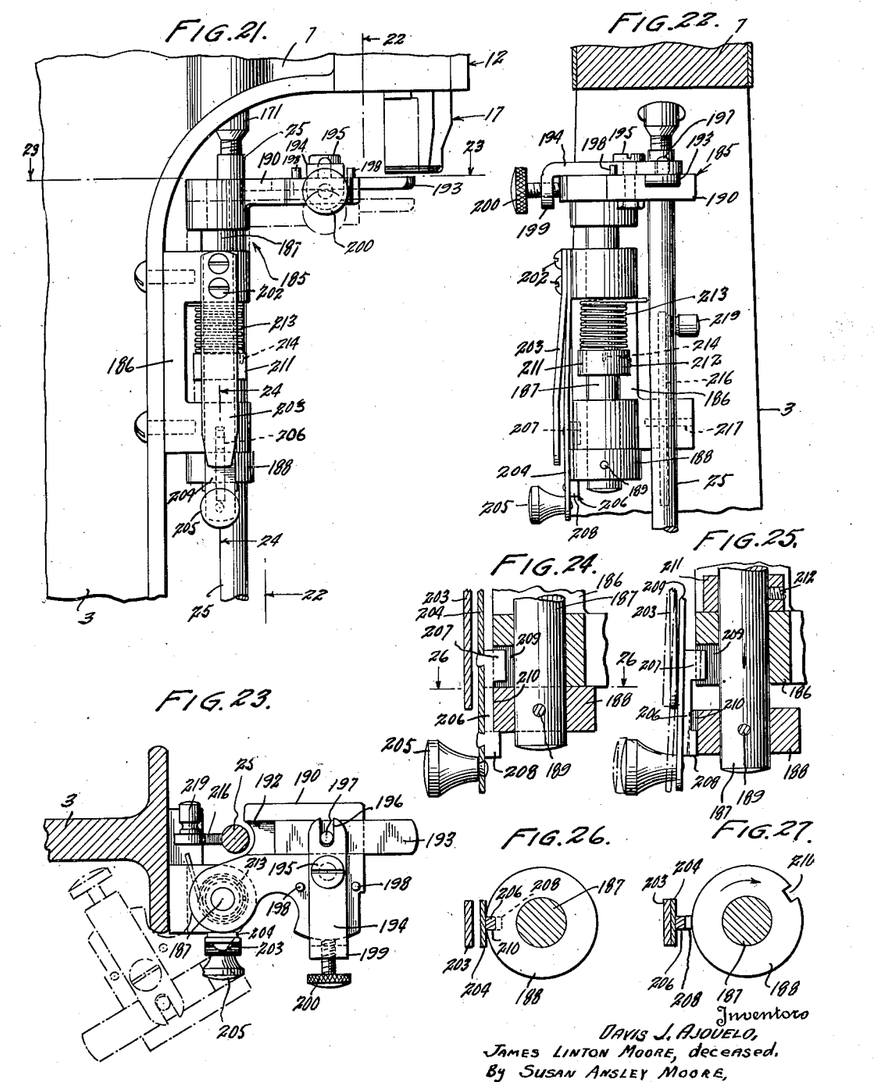
Figure 21 is a view in side elevation showing the guide member in position.
Figure 22 is a view taken along line 22—22 of Figure 21 looking in the direction of the arrows.
Figure 23 is a view taken along line 23—23 of Figure 21 looking in the direction of the arrows.
Figure 24 is a view taken along line 24—24 of Figure 21 looking in the direction of the arrows.
Figure 25 is a view similar to Figure 24 showin the mechanism in the lowered position.
Figure 26 is a view taken along line 26—26 of Figure 24 looking in the direction of the arrows.
Figure 27 is a view similar to Figure 26 showing the mechanism in the retracted position.

To regulate the position of the shoe or the layers of material to be united with respect to the fastener positioning opening 151 and the plunger point 61 operating therethrough, there is provided a gauge or regulating device depicted generally by the numeral 185. The gauge will insure a uniform line of fastenings with respect to the edge of the materials to be united. The gauge comprises a mounting bracket 186 which is secured to the upright 3 below the head 7. A shaft 187 is journaled in the bracket and a collar 188 is keyed to the lower end of the shaft by a pin 189. A guide carrying plate 190 is attached to the upper end of the shaft 187 and is formed with a groove 192 adjacent one edge and a guide 193 is slidably mounted therein. A lever 194 which is pivotally attached to the plate 190 at 195 has a forked end 196 which engages a pin 197 carried by the guide 193 for imparting movement thereto. The extent of the movement of the guide 193 is limited by pins 198 which are carried by the plate 190 on opposite sides of the lever 194. As shown in Figure 22, the lever 194 is provided with a downturned edge 199 and a screw 200 is adapted to lock the guide 193 in proper position. Manifestly, when the edge of the shoe is placed between the horn 4 and the knife mechanism 17, it will contact the end of the guide 193 which will determine the location of the fastener with respect to the shoe.

When it is desired to go across the sole at the shank of the shoe, or for fastening patches, it is necessary that the guide be out of the way, and in order to swing the guide automatically, the following arrangement is provided. Attached to the bracket 186 as shown at 202 is a downwardly depending spring member 203. A spring member 204 is also attached to the bracket at the point 202 and is positioned beneath the member 203. As shown in Figure 24, the spring 204 is provided at its lower end with an operating button 205 and a key member 206 having offset portions 207 and 208. The offset portions 207 and 208 are adapted to fit into the recesses 209 and 210 in the bracket 186 and collar 188 respectively. By reference to Figures 22 and 23, it can be noted that when the key 206 is within the recess 210 and when the offset portion 208 is under the collar 188, the guide 185 will be in position close to the knife and adjacent the wire positioning opening. A collar 211 is secured to the shaft 187 by a screw 212, and a coil spring 213 is positioned between the collar and the upper end of the bracket 186. One end of the spring bears against the bracket 186 and the opposite end is affixed to the collar 211 as shown at 214. The guide 185 can assume two vertical positions which are shown by the full and dotted lines in Figure 21. When the guide is in the position indicated by the full lines, (Figures 21 and 23) it is adapted to be used when it is desired to sole the shoe. On the other hand, in securing a heel lift, it can be seen, particularly in Figure 35, that the guide should be positioned farther from the knife so that it will not be necessary to trim the lift before it is attached to the heel. In order to maintain the guide in its uppermost position, or in the position depicted by the full lines in Figure 21, the collar 188 should be moved to the position shown in Figure 24. In other words, the collar 188 should abut the lower portion of the bracket 186 and it will be held in this position by the offset portion 208. When it is desired to lower the guide, as would be necessary in the cause of securing a heel lift, by merely pulling the knob 205 outwardly the offset portion 208 would be pulled free from the collar 188 and the shaft 187 would be forced downwardly to the position shown in Figure 25 through the action of the spring 213 and the offset 208 would then fit in the recess 210.

In the event the operator should desire to fasten the shank of the sole, the guide 185 can then be completely moved away from the knife by merely withdrawing the offset portion 208 from its recess. When these portions are removed, the guide will be swung to the position shown by the dotted lines in Figure 23 through the action of the spring 213.

To reposition the gauge adjacent the knife, the operator swings the guide plate 190 back to its operative position where the offset portion 208 again fits within its recess 210 in the collar 188. In this position the guide 193 is in its lowered or heel lift position. To raise it to its upper position he merely lifts the guide plate 190 until the extension 208 drops under the collar 188 and the key 206 fits within the recess 210.

For ease in adjusting the gauge to the desired position, the two spring members 203 and 204 are provided with different rigidities, the outer spring 203 being the stiffer. To lower the guide to the position for fitting heel lifts, the operator merely pulls the knob 205 outwardly until the spring 204, which carries the key 206, abuts the spring 203. In this position the offset 208 is permitted to enter the recess 210 when the guide will automatically lower by action of the spring 213. Further movement of the knob against the tension of the spring 203 will withdraw the offset 208 from the recess 210 and permit the spring 213 to swing the guide out of the way or to the position shown by dot and dash lines in Figure 23.

The foregoing construction constitutes an efficient guide which can be easily adjusted to control the points of insertion of the fasteners with respect to the edge of the sole or other materials to be united.

Figures 3, 4, 5, 6, 7:
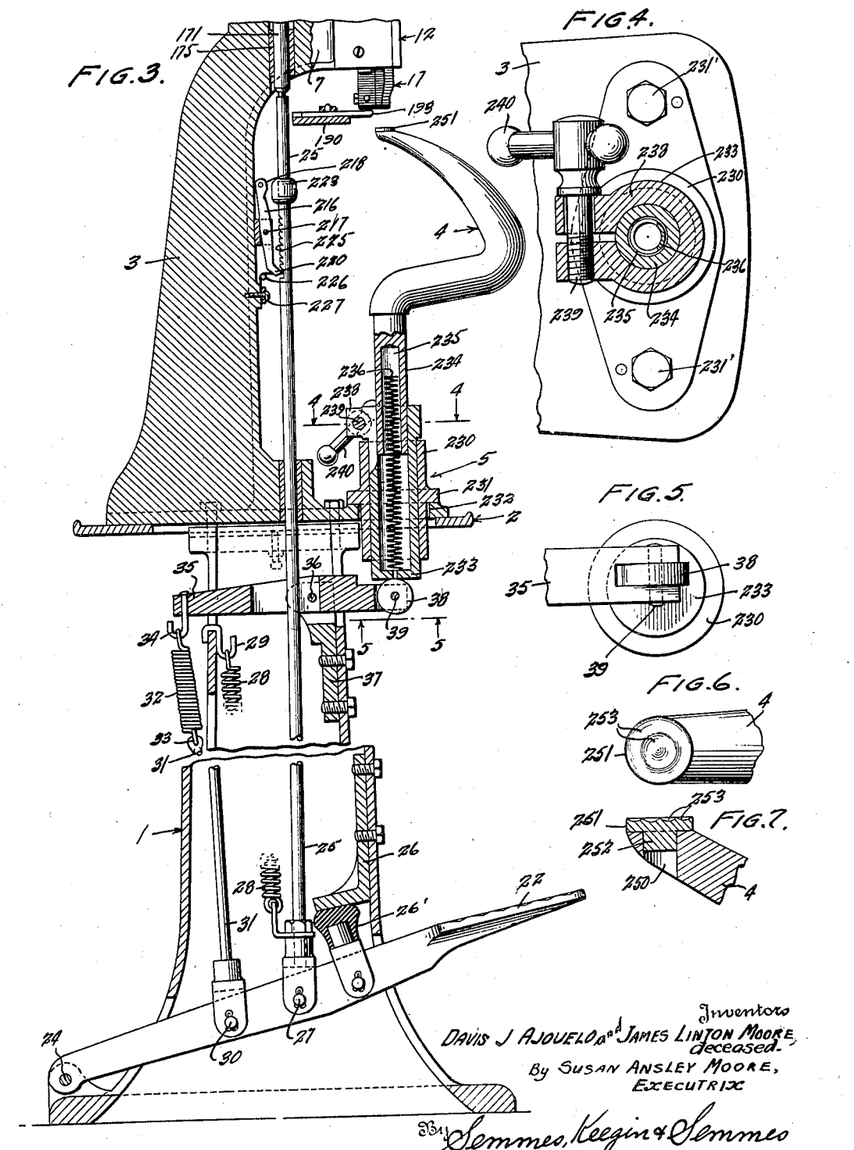
Figure 3 is a view taken along line 3—3 of Figure 2 partly broken away looking in the direction of the arrows.
Figure 4 is a view taken along line 4—4 of Figure 3 looking in the direction of the arrows.
Figure 5 is a view taken along line 5—5 of Figure 3 looking in the direction of the arrows.
Figure 6 is a fragmentary top plan view of the horn tip.
Figure 7 is a sectional view of the construction shown in Figure 6.
Figures 28, 29:
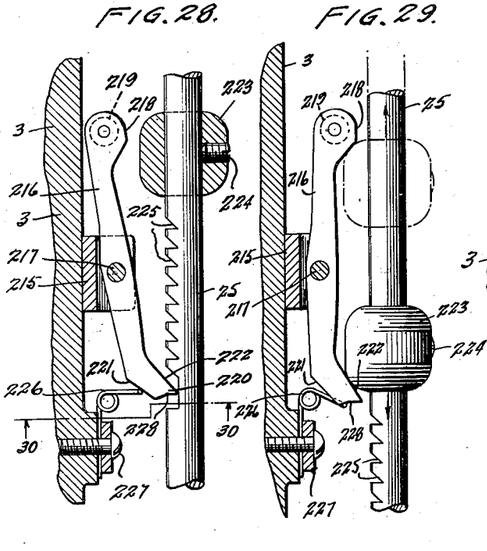
Figure 28 is a fragmental view partly in section showing the means whereby the plunger mechanism cannot move in an upward direction until it has completed its downward stroke, showing the parts when the plunger mechanism is in its up position.
Figure 29 is a view similar to Figure 28 showing the parts when the plunger is moving downwardly.
Figure 30:
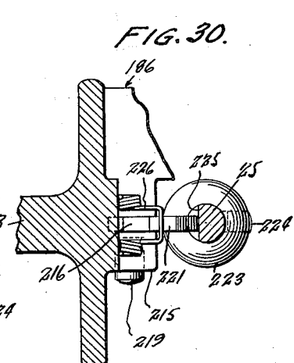
Figure 30 is a view taken along line 30—30 of Figure 28 looking in the direction of the arrows.

To prevent return movement of the plunger mechanism to its initial upward position until it has reached the limit of its downward stroke, we have provided the following safety device. As shown in Figures 3 and 28, a bifurcated support 215 is suitably supported on the upright 3 and a lever arm 216 is pivoted thereto as depicted at 217. It can be seen that the arm 216 is provided at its upper extremity with an offset portion 218 with an operating knob 219. The lower end of the arm has a finger 220 and sloping portions 221 and 222. Mounted on the control rod 25 is a cam block or surface 223 which is adjustably secured to the rod by a set screw 224. A series of teeth 225 are formed in the rod 25 immediately below the cam 223. The finger 220 of the lever 216 is adapted to engage the teeth 225. A U-shaped spring 226 which is affixed to the upright 3 as shown at 227 is adapted to engage the portion 221 of the arm and maintain the finger in engagement with the teeth. As is believed readily apparent, the cam 223 engages the area 218 of the lever 216 when the operating rod 25 has reached the limit of its upward stroke, thereby causing the finger 220 to engage the lowermost tooth 225.

When the rod 25 has reached the limit of its downward stroke, the cam 223 engages the surface 222 and moves the arm 216 rearwardly about its pivot 217 thereby moving the finger out of the path of the teeth 225. The spring 226 will then fit into a notch 228 in the lower extremity of the arm and hold it in this position until the control rod has returned to its initial position and the cam 223 has engaged again the surface 218 of the arm 216.

The above discussed mechanism is particularly efficacious as it will prevent any jamming of the feeding, inserting or cutting mechanisms within the housing, since the plunger rod cannot be moved upwardly until its downward stroke has been completed.

The structural details of the horn 4 which moves the materials to be united into position with respect to the fastener inserting mechanism are best depicted in Figures 3 to 7.

A sleeve 230 having a flange 231 extends through an opening 232 in the bracket 3 and is attached to the shelf 2 by means of bolts 231'. As shown in Figure 3, a socket 233 is a slidably fitted within the sleeve 230 and the lowermost extremity is adapted to engage the roller 38. The horn 4 is provided with an extension 234 having a bore 235. The extension 234 is adapted to fit within the socket 233 and a coil spring 236 is provided in the bore 235, one end of which bears against the lower end of the socket 233. This spring serves to facilitate adjustment of the horn and to act as a cushion for the horn when its clamping means are loosened. By reference to Figure 4, it should be noted that the socket 233 is formed with a split collar 238 and a screw 239 having an operating handle 240 extends through apertures provided in the collar. Obviously, by a proper actuation of the handle 240 the horn can be locked in any desired position by the operator.

To set the horn 4 for attaching soles, the operator should loosen the collar 238 which clamps the horn extension 234 and the horn is then raised until the area between the horn tip and the bottom of the cutting mechanism 17 is proper to accommodate the sole of a shoe. We have found that a convenient way to set the horn at substantially the correct position is to raise it until there is only room for the top of the index finger to pass comfortably between the horn tip and the bottom of the knife. The split collar 238 is then tightened by means of the operating handle 240 so that the horn cannot slip during the operation of the machine. The horn 4 should always be high enough so that it will grip the shoe tightly during the securing operation.

As shown in Figure 5, the roller 38 bears against the bottom of the socket 233 somewhat off center. In practice it has been found that this position of the roller will give a rolling movement and will thereby reduce wear, etc. However, it is to be understood that the roller 38 can be positioned directly in the center of the bushing or in any other desired position.

In connection with the horn 4, it is to be noted particularly with reference to Figures 6 and 7 that the end of the horn is provided with a vertical aperture 250. A horn tip or anvil 251 having an extension 252 fits tightly within the aperture 250.

The upper face of the tip 250 is provided with a plurality of concentric grooves 253. The concentric grooves 253 are of paramount importance as they will enable the fastening element to be clinched in the materials to be united. For example, if the fastener should be deflected by an obstruction in the shoe, it will nevertheless be clinched due to the concentric grooves. Regardless of the position of the fastener when it strikes the horn tip, a proper clinch is always afforded.

When it is desired to secure a heel lift to ladies' shoes, there is positioned over the horn tip 251 a heel cap 255. In Figure 36, it can be seen that the heel cap 255 comprises an elongated spring member 256 having a cap 257 at one end thereof which fits over the anvil 253. Integrally formed with the member 256 are a pair of spring arms 258 which are adapted to fit around the horn and hold the member 256 in proper position. The other end of the member 256 is slightly upturned as at 259 so as to enable the operator to lift easily the cap free from the horn. The cap 257 can be knurled as at 260 to prevent slipping. The use of the heel cap will protect and prevent any damage to the sock lining of the shoe as clearly shown in Figure 35. The operation of the machine for applying heel lifts is also clearly illustrated in Figure 35.

Figure 37:
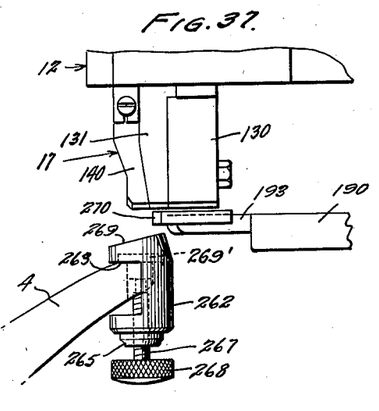
Figure 37 is a fragmentary view in side elevation showing the stitchdown attachment in position upon the horn tip.
Figure 38:
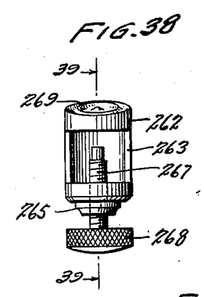
Figure 38 is a front elevation of the stitchdown attachment shown in Figure 37.
Figure 39:
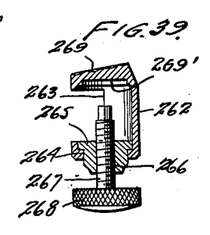
Figure 39 is a view taken along line 39—39 of Figure 38 looking in the direction of the arrows.

In order to enable the horn 4 to be used when it is necessary to resole stitchdowns, there is provided the following attachment. By reference to Figures 37 to 38 it can be seen that there is employed a substantially cylindrical member 262 which is cut away as shown at 263. The member 262 is formed with an aperture 264 into which is fitted a flanged plug 265 having a threaded bore 266. A screw 267 having an operating head 268 is adapted to be screwed into the bore 266. The top portion of the cylindrical member 262 is angularly disposed and is provided with a plurality of concentric grooves 269 which are similar both in construction and function to the grooves 253. The member 262 is also provided with an internal recessed portion 269' which fits over the horn tip 253 to hold the attachment concentric therewith. The attachment 262 is held securely to the horn by means of the screw 267 as shown in Figure 37.

Figures 40, 41, 42, 43, 44, 45, 46:
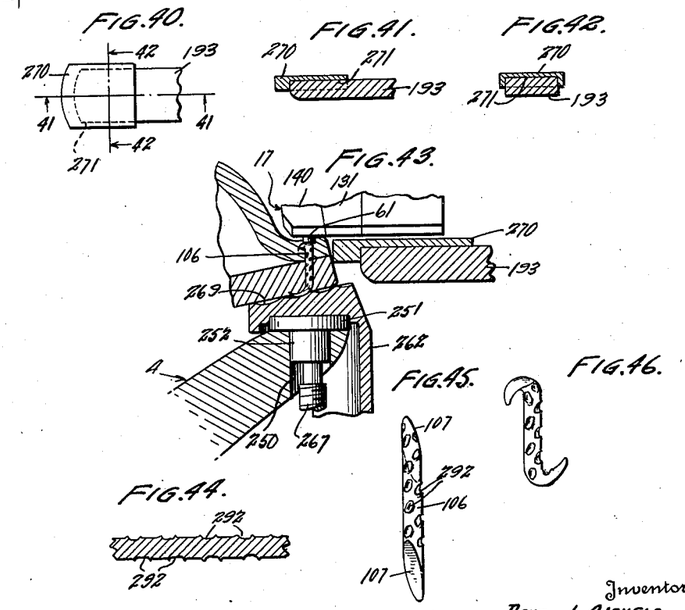
Figure 40 is a top plan view of the stitchdowner guide.
Figure 41 is a view taken along line 41—41 of Figure 41 moving in the direction of the arrows.
Figure 42 is a view taken along line 42—42 of Figure 40 looking in the direction of the arrows.
Figure 43 is a detailed sectional view showing the mode of operation of the stitchdowner and guide at the time of clinching the fastener to the sole.
Figure 44 is a fragmentary sectional view showing our improved metallic fastener wire.
Figure 45 is a detailed view of the fastener after it has been severed by the cutting mechanism.
Figure 46 is a detailed view of the fastener as it looks after it has been clinched into the material.

When resoling a stitchdown type of shoe it is necessary that the fastener be properly inserted through the welt and clinched in the out sole. For this purpose a guide 270 having a groove 271 is provided. The groove 271 is of such dimensions as will enable the guide to slide on the guide member 193 of the gauge mechanism 185 as clearly shown in Figures 40 to 42 inclusive. In Figure 43 the manner in which the guide for soling stitchdown shoes is employed is clearly depicted.

The above attachment is quite simple both in construction and operation and can be easily and quickly attached to or removed from the horn tip.

Figure 31:
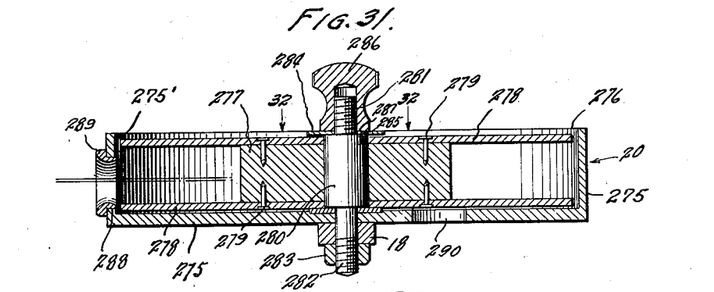
Figure 31 is a view taken along line 31—31 of Figure 1 looking in the direction of the arrows.
Figure 32:
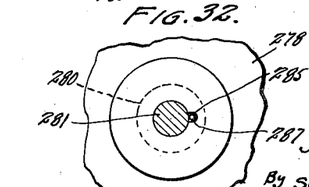
Figure 32 is a view taken along line 32—32 of Figure 31 looking in the direction of the arrows.

As previously discussed, a reel of wire is carried in a casing 20 attached to the head 7. The details of the reel are best shown in Figure 31. The casing 20 comprises a cylindrical member 275' which is provided with an open side 275. The reel is formed of a circular block 277 having side plates 278 secured thereto as shown at 279. A concentric hub 280 is provided with threaded ends 281 and 282, the threaded end 282 extending through apertures in the casing 275, and in the bracket 18. A nut 283 is threaded onto the end 282. The reel is rotatably carried on this hub. A washer 284 having a keyway 285 is positioned between the side reel and a knurled nut 286 which is screwed onto the end 281 of the hub. A key 287 fits in the keyway 285 to prevent the nut 286 from coming off.

An aperture 288 is formed in the casing 275 and an eyelet of wear-resisting material 289 is fitted into the aperture 288. The wire carried on the reel is adapted to project through the aperture 288 as clearly shown in Figures 1 and 2. When it is necessary to replace the reel of wire, the nut 286 is removed from the threaded end 281 of the hub and by applying pressure with a finger through an aperture 290, the old reel can be easily removed from the casing.

We have discovered the particular type of wire which we prefer to employ is shown clearly in Figures 44 to 46. The wire is preferably made of a mild steel with a lacquer finish and is knurled or roughened as shown at 292. By using this type of wire a greater amount of friction between the materials to be united and the fastener is afforded and there is practically no danger of the fasteners working loose. However, other types of wire can be employed and we do not restrict ourselves to the specific wire shown.

While it is believed that the operation of this machine is apparent from the foregoing description, it might be well to trace the complete operation. After the required length of the fastener has been determined by proper manipulation of the lever 113 and the wire has passed through the feeding mechanism 15 and through the guide tube 108 with its end adjacent the upper edge of the knife 17 and the material to be united is positioned on the horn tip 251, the treadle 22 is depressed. The downward movement of the pedal 22 will pull down the operating rod 25, the crosshead 123, the feeder arm 125, and the plunger 53. During the downward cycle of the operating rod 25, the arm 125 will engage the feeder cam 92 moving the feeding mechanism 15 and feeding the wire into the knife. The wire will be fed downwardly into the complemental slots 134 and 153, a distance which is equal to the downward stroke of the feeding mechanism 15. At this point, the cam surface 60 of the plunger mechanism will engage the area 157 of the arm 156 thereby moving the arm to a perpendicular position and actuate the movable knife member 140. The movable knife will cause the cutting edges of the movable and stationary blades to cause a shearing of the wire and form a fastener 106 which is clearly shown in Figure 45. When the arm 156 has reached the limit of its movement, aperture 151 carrying the fastener 106 will register with aperture 155 at which time the fastener will be in alignment with the plunger point 61. As the plunger point continues its downward movement it will pass through the aperture 151 expelling the fastener 106 and inserting it into the materials to be united. The lower end of fastener 106 will contact the horn tip 251 whereby it will be clinched in one direction and due to the oppositely inclined point and the concave tip of the plunger, the other end will be clinched by the plunger point in an opposite direction.

Simultaneously with the initial downward movement of the control rod 25, the rod 31, also secured to the foot pedal, will pull down one end of the arm 35. When the arm 35 is depressed, the roller 38 will bear against the socket 233 and move the horn upwardly toward the bottom surface of the cutting mechanism fixing the materials being united in proper position.

Moreover, during the downward movement of the control rod 25, the ratchet mechanism will prevent any upward movement of the control rod or its associated parts until all such members have reached the limit of their downward stroke. When the rod reaches such limit, the ratchet will release, thereby allowing the control rod 25 to return to its initial position.

The action of all the above mentioned mechanism occurs during the downward travel of the control rod and while it is moving from its initial position to the limit of its downward stroke. When pressure is removed from the foot pedal 22, the spring 28 will return the pedal and control rod 25 to their initial positions and the machine is again ready for another operation.

It will be appreciated from the foregoing description that there is provided a machine for making and inserting metallic fasteners which will feed the wire the required distance, sever the wire to form a fastener and position the fastener with respect to the inserting mechanism and then insert and clinch the fastener in the materials to be united. All of the above mentioned operations take place during the downward stroke of the plunger mechanism.

In addition we have provided a guide mechanism which will enable the machine to be used for soling shoes or attaching heel lifts. Moreover, there is further incorporated an attachment which may be secured to the horn so that the stitchdown type of shoe can be soled.

Most machines for performing the work done by this machine operate by drawing the plunger upward against a spring. The spring in the old form of device generally tripped and forced the plunger down very hard. Our machine on the contrary has the plunger directly connected with the driving mechanism and draws the plunger down slowly, while the shoe is held in place by a gentle pressure. Thus beating or pounding of the shoe in an injurious way is avoided.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A machine for making and inserting fasteners into materials to be united comprising a feeding mechanism, a cutting mechanism, and an inserting mechanism, means to operate said mechanisms simultaneously, guide means to position the materials with respect to the machine, the guide means being pivotally mounted at a point adjacent the inserting mechanism and adapted to assume at least two different vertical positions, and means to swing the guide means in a horizontal plane about its pivot away from the machine.

2. A gauge mechanism for shoe machinery comprising a supporting bracket, a vertical shaft journaled in said supporting bracket, a collar at the lower end of the shaft, a guide carried by the opposite end of the shaft, and means associated with said bracket and shaft to swing the guide member from an operative to an inoperative position.

3. A gauge mechanism for shoe machinery comprising a supporting bracket, a vertical shaft journaled in said supporting bracket, a collar at the lower end of the shaft, a guide carried at the opposite end of the shaft, means tending to hold normally the guide in operative position and spring means to swing said guide to an inoperative position.

4. A gauge mechanism for shoe machinery comprising a supporting bracket, a vertical shaft journaled in said supporting bracket, a collar at the lower end of the shaft, a guide carried at the opposite end of the shaft, means to move said shaft to assume at least two vertical positions and means to swing the guide from an operative to an inoperative position.

5. A gauge mechanism for shoe machinery comprising a supporting bracket, a vertical shaft journaled in said bracket, a collar carried by the lower end of the shaft, a guide secured to the opposite end of the shaft, said shaft being adapted to assume at least two vertical positions, and means to impart rotary movement to said shaft to swing the guide from an operative to an inoperative position.

6. A gauge mechanism for shoe machinery comprising a supporting bracket, a vertical shaft journaled in said bracket, a collar carried by the lower end of said shaft, a guide secured to the opposite end of the shaft, said shaft being adapted to assume at least two vertical positions, and spring means surrounding the shaft to impart rotary movement to the shaft to swing the guide from an operative to an inoperative position.

7. A gauge mechanism for shoe machinery comprising a supporting bracket, a vertical shaft journaled in said supporting bracket, a collar at the lower end of the shaft, a guide carried at the upper end of the shaft, means to move said shaft to assume at least two vertical positions, and spring means to swing the guide from an operative to an inoperative position.

8. A gauge mechanism for shoe machinery comprising a supporting bracket, a vertical shaft journaled in said bracket, a collar carried by the lower end of the shaft, a guide secured to the opposite end of the shaft, a holding member secured at one end to the bracket and carrying a key at the opposite end, a key-way in said collar into which the key fits when the guide is in its operative position, and spring means to swing the guide to an inoperative position when the key is removed from the key-way.

SUSAN ANSLEY MOORE,
*Executrix of the Estate of J. Linton Moore, Deceased.*

DAVIS J. AJOUELO.